Sept. 11, 1928.                                                                1,683,780
                              C. HÜLSMEYER
               METHOD OF AND APPARATUS FOR PURIFYING WATER
                              Filed Sept. 19, 1923
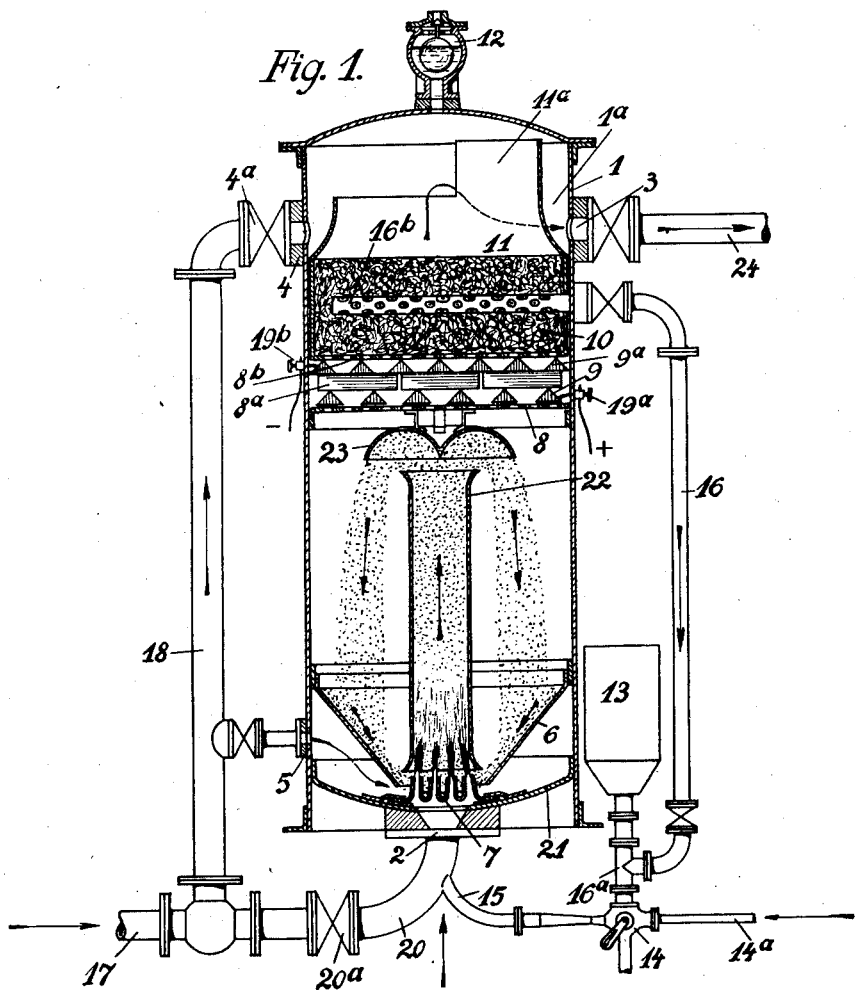
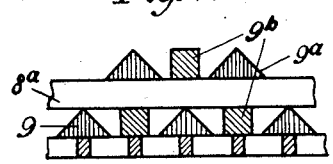
Inventor:

Patented Sept. 11, 1928.

1,683,780

UNITED STATES PATENT OFFICE.

CHRISTIAN HÜLSMEYER, OF DUSSELDORF, GERMANY.

METHOD OF AND APPARATUS FOR PURIFYING WATER.

Application filed September 19, 1923, Serial No. 663,637, and in Germany July 31, 1922.

My invention relates to the art of purifying water, which contains air and gases besides the mineral constituents which are present in a state of solution. These mineral constituents cause accumulations of mud and deposits of scale, whereas air and gases are responsible for the formation of rust, and are undesirable ingredients for many other reasons.

Now, it is the object of my present invention to provide improvements in the method and means for separating from the water air, gases, and undesirable mineral ingredients. To this end I add to the water iron or iron compounds in a finely disintegrated condition. It is well known that these substances are, in this condition, especially active in attracting a large proportion of those constituents and ingredients which the water contains in a dissolved state. And I have found that ferroso-ferric-oxide is specially effective, and that those iron compounds; well known as hammer scale, mill cinder etc. are superior in this respect to the metallic iron. It is an essential feature of my invention that the deoxidizing means thus added to the water be maintained moving therein by the moving force of the water itself. For that purpose I cause the water to circulate and maintain said circulation until every particle of water has been acted upon by said deoxidizing agent. It is a further object of my invention to provide means whereby said deoxidizing means are prevented from depositing away from the moving body of water. It is a further object of my invention to provide means whereby said deoxidizing agent and the undesirable constituents and ingredients are arrested and thus separated from the water treated. To attain this further object I cause the water to pass through a magnetic system, wherein, moreover, the gases carried along with the water in a dissolved state are caught and partly combined by oxidation. This effect of the magnetic system may, in particular cases, be combined with an electric treatment of the water by connecting the poles of an electric source to the opposite sides of the magnetic field. Thus, the magnets, in cooperation with the powdered particles of iron and iron compounds caught between them, form an electric bridge which abundantly acts upon the water. Moreover, I provide for a circulation of the water in conjunction with said deoxidizing agent through said magnetic and electric fields. This circulation may be produced by the moving force of the water and may be amplified by means of an additional current of water or steam.

Since the deoxidizing agent carried along by the water is liable to gravitate to the bottom of the container, I provide for returning the same to the opening through which the water enters the container, either by means of a suitable form of the container bottom, or by means of a circular current of water or steam acting just above the container bottom.

Other objects of my invention will become apparent from the following description of an apparatus for carrying the same into effect, an example of which is shown in the drawing accompanying this application, and in which Figure 1 is a vertical cross-section, while Figure 2 illustrates a modification of an arrangement of parts shown in Figure 1.

The container 1 is provided with an entrance opening 2 connected with a water feed pipe 20. This latter is provided with a valve 19 and forms a continuation of the water feed pipe 17, of which a branch 18 leads to an accessory opening 5 and a head opening 4 of the container 1. Above the bottom 21 of the latter is provided a funnel-like structure 6 into which projects a multiple lip-valve 7. Above this valve is provided a vertically extending circulation pipe 22, and over the upper end of the latter I prefer to arrange a current reversing plate 23 of any approved construction.

Upon a perforated plate 8 I arrange a layer of magnets 9 which are of triangular section and carry by means of intermediate magnets 8ª another layer of magnets 9ª. Upon another perforated plate 8ᵇ rests a bed 10 of what is known as steel wool or chips or the like small pieces of steel, which, in view of the purpose of my invention is rendered magnetic.

Upon this bed 10 is arranged an annular member 11 which is contracted in upward direction. On the top 1ª of the container is provided an automatic air or gas vent 12 which may be actuated by a float housed in the casing thereof.

A receptacle 13 is located outside the container 1 and near its bottom to contain the iron or other deoxidizing substances which are introduced into the container bottom by a pipe 15 which, in the example shown, is made integral with the pipe 20 and communicates with an ejector 14 or any other pump. Into the connection 16ª between the receptacle 13 and the injector 14 terminates a by-pass pipe 16 extending downwards from the upper part of the container and forming a return conduit.

The magnets form superposed layers in which they are so arranged that, firstly, the magnets of two connective layers cross each other, and, secondly, the magnets of the same direction of the superposed layers are arranged in staggered manner. The arrangement of these parts is, practically, somewhat similar to the filling of so-called labyrinth absorption towers. A modification of the arrangement shown in Figure 1 is illustrated in Figure 2, the difference being that the magnets are separated from each other in each layer or series by intermediate members 9$^b$ relieving the magnets of the respective layer or series of the weight of the upper layer of magnets.

Owing to the magnets being arranged crosswise, as well as in staggered manner, they form labyrinthian passages for the water which, therefore, is thoroughly distributed through the field of magnetic lines, and at the same time the particles of iron come intimately in contact with the magnets and are attracted and retained by them so that, on one hand, the particles are prevented from being carried away by the water on its way to the discharge opening, and on the other hand, the water arriving in the magnetic field from below is once more acted upon by the retained particles.

The triangular sectional shape of the magnets which may be solid or hollow, prevents the particles of iron from depositing on the magnets; they are apt to gradually slide down on the inclined lateral surfaces of the magnets and thus reenter the water circulating below said layers of magnets.

Instead of permanent magnets electromagnets may be used. To act on the water electrically by ionization, the magnets are separated from the wall of the container by an insulation and electric terminals 19$^a$, 19$^b$ are provided by which the magnets can be charged with an electric current. The magnets quickly become coated with a layer of oxide, whereby they are insulated from each other so that the electric current must pass through the water. The particles of iron suspended on the edges of the magnets, then form part of the electric circuit and offer a great resistance and render the electrical action very effective.

The mode of operation is as follows:

The water to be purified is introduced into the container 1 through the pipe 15, the valve 20$^a$, and the pipe 20, and the disintegrated iron (or an equivalent substance) contained in the receptacle 13 is added to the water through the pipe connections shown. For that purpose the injector 14 may be set in action to assist in admixing the deoxidizing substances with the water, or a circulation of water may be set up through the by-pass tube 16 whereby the deoxidizing substances are being drawn into the current of water passing below the receptacle 13.

The thus formed mixture enters the container 1 through the set of lip valves 7 which are opened by the pressure and remain open as long as they are under the pressure of the entering water.

The mixture of the water and the particles of iron or the like, flows upwards through the vertical tube 22 and impinges on the reversing plate 23 by which the particles are conducted into the annular chamber formed without the tube 22. A part of the water continues its way upwards through the layer of the magnets, whereas the other part moves downwards in said annular chamber together with the iron particles.

There is an annular passage between the lip valves 7 and the lower edge of the tube 22, another annular passage between the lower edge of the hopper-like structure 6 and the lower edge of the tube 22, and a third annular passage between the bottom 21 and the structure 6. The annular chamber formed between the structure 6 and the bottom 21 receives water through the pipe 5 from the pipe 1 by means of the lower pipe 18, and the mixture arriving above the lower edge of the structure 6, is thus being sucked into the tube 22 by means of the jets issuing from the lip-valves 7, and this action is assisted by the pressure of the water issuing from the pipe 5.

The portion of the water continuing its way upwards, is acted on firstly, by the magnets, and preferably also by an electric current, and, secondly, by the magnetic steel wool or chips 10 or the like in the form of a compressed mat which surrounds a perforated tube 16$^b$ connected with the tube 16 and forming a part of the described by-pass. The thus treated water rises in the hood 11 which is provided with a projection 11$^a$ located opposite the discharge opening 3. The hood 1$^a$ and the opposite part of the wall of the container form an annular channel which receives the purified water and conducts it to the opening 3. The separated gases and mechanical impurities which have got to the top of the container are conducted away through the valve 12, the valve disk proper of which is controlled automatically by means of a float in well known manner.

The water to be treated, instead of being forced through the apparatus by pressure, may be drawn through the same by suction. In such a case, too, the circulation may be augmented by means of the injector 14 or any equivalent means and the whirling action of the water is then independent of the quantity of the water supplied through the pipe 17.

The water circulating through the by-pass 16, 16ª, 15 enters the pipe 16 by means of the perforated pipe 16ᵇ through which the impurities retained within the bed of steel-wool, steel chips, or the like, as well as any iron particles which have found access thereinto, are sucked away whereby not only the said filter bed is cleaned, but the iron particles are re-introduced into the circulating mixture.

Finally, it is possible to cause water to flow through the filter 10 in the reverse direction for cleaning purposes. The valve 20ª is then closed and the valve 4ª is opened and also a bottom valve especially provided for this purpose in a discharge pipe (not shown) for accumulated waste, is opened, the washing water being conducted through the container from above to below until the filter is again in proper condition. The steel wool acts both as a mechanical and a chemical filter, and has the advantage that as parts of it are rusted away the remaining strands expand to take the place of the rusted strands thereby filling up any gaps which may occur.

The muddy water may be caused to pass through a sand-filter or other filter in order to be purified for re-use, and also the water leaving the apparatus through the discharge pipe 24 may be treated in this or a similar manner in order to remove mechanical impurities which the water is carrying away with it.

What I claim, is:—

1. A device of the class described comprising a vertically extending chamber, a deoxidizing material in the lower part of said chamber, means for introducing water into the lower part of said chamber in such a way as to cause the deoxidizing material to circulate with the water in the lower part of said chamber, a filter in said chamber above the zone of circulation, and an outlet for the water above said filter, whereby the deoxidizing material accumulating in said filter will fall by gravity into the zone of circulation.

2. A device in accordance with claim 1 in which the deoxidizing material contains iron, in combination with a lattice of magnets mounted below the filter.

3. A filter for separating comminuted iron containing material from a liquid comprising a mat of magnetized steel wool.

4. A filter for removing solids from liquids comprising a mat of filtering material, a perforated tube extending through said filtering material, and means for sucking the liquid through said tube and therewith the solids accumulating in the filter.

5. As an element of a water purifying apparatus, a purifying material consisting of powdered iron-scale.

CHRISTIAN HÜLSMEYER.